United States Patent
Hu et al.

(10) Patent No.: US 10,056,780 B2
(45) Date of Patent: Aug. 21, 2018

(54) POWER SUPPLY SYSTEM, UNINTERRUPTIBLE POWER SUPPLY SYSTEM, AND POWER SUPPLY METHOD

(71) Applicant: DELTA ELECTRONICS, INC., Taoyuan (TW)

(72) Inventors: Pei-Qing Hu, Taoyuan (TW); Chao Yan, Taoyuan (TW); Jian-Hong Zeng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 305 days.

(21) Appl. No.: 14/953,001

(22) Filed: Nov. 26, 2015

(65) Prior Publication Data

US 2016/0181865 A1    Jun. 23, 2016

(30) Foreign Application Priority Data

Dec. 23, 2014   (CN) .......................... 2014 1 0811848

(51) Int. Cl.
| | |
|---|---|
| *H02J 7/00* | (2006.01) |
| *H02J 9/06* | (2006.01) |
| *H02M 3/335* | (2006.01) |
| *H02M 1/12* | (2006.01) |
| *H02M 1/00* | (2006.01) |

(52) U.S. Cl.
CPC ............... *H02J 9/061* (2013.01); *H02M 1/12* (2013.01); *H02M 3/33507* (2013.01); *H02M 3/33569* (2013.01); *H02J 7/0068* (2013.01); *H02M 2001/0058* (2013.01); *Y02B 70/1491* (2013.01)

(58) Field of Classification Search
None
See application file for complete search history.

(56) References Cited

U.S. PATENT DOCUMENTS

| | | |
|---|---|---|
| 5,623,398 A | 4/1997 | Beach et al. |
| 7,752,878 B2 | 7/2010 | Schmeink |
| 2006/0226130 A1 | 10/2006 | Kooken et al. |

(Continued)

FOREIGN PATENT DOCUMENTS

| | | |
|---|---|---|
| CN | 201134750 Y | 10/2008 |
| CN | 101621254 A | 1/2010 |

(Continued)

*Primary Examiner* — Jared Fureman
*Assistant Examiner* — Aqeel Bukhari
(74) *Attorney, Agent, or Firm* — CKC & Partners Co., Ltd.

(57) ABSTRACT

A power supply system includes a first converting stage, a second converting stage, and a third converting stage. The first converting stage is configured to generate a first voltage according to a first input voltage. The second converting stage is coupled to the first converting stage in series, and includes a first non-regulated power converter and a second non-regulated power converter. The first non-regulated power converter is configured to generate a second voltage according to the first voltage. The second non-regulated power converter is configured to generate a third voltage according to the second voltage. The second voltage is higher than the third voltage, and a varying range of the second voltage is wider than a varying range of the third voltage. The third converting stage is configured to generate a first output voltage according to the third voltage.

20 Claims, 9 Drawing Sheets

(56) References Cited

U.S. PATENT DOCUMENTS

| | | | |
|---|---|---|---|
| 2009/0206804 A1* | 8/2009 | Xu | H02M 3/1584 |
| | | | 323/234 |
| 2013/0027981 A1* | 1/2013 | Liu | H02M 3/335 |
| | | | 363/17 |
| 2013/0194847 A1* | 8/2013 | Taddeo | H02M 1/10 |
| | | | 363/123 |
| 2014/0307482 A1* | 10/2014 | Chen | H02M 3/3376 |
| | | | 363/21.02 |
| 2017/0288533 A1* | 10/2017 | Sandusky | H02M 3/07 |

FOREIGN PATENT DOCUMENTS

| | | |
|---|---|---|
| CN | 102315775 A | 1/2012 |
| CN | 102374448 A | 3/2012 |
| CN | 103187864 A | 7/2013 |
| EP | 0910168 A1 | 4/1999 |
| TW | M449407 U | 3/2013 |
| TW | 201315094 A | 4/2013 |
| TW | 201332274 A | 8/2013 |

\* cited by examiner

POWER SUPPLY SYSTEM, UNINTERRUPTIBLE POWER SUPPLY SYSTEM, AND POWER SUPPLY METHOD

RELATED APPLICATIONS

This application claims priority to China Application Serial Number, 201410811848.2, filed Dec. 23, 2014, which is herein incorporated by reference.

BACKGROUND

Technical Field

The present disclosure relates to a power supply system. More particularly, the present disclosure relates to a power supply system having a non-regulated power converter.

Description of Related Art

Power supply system has been widely utilized in data centers, communication equipment, etc. The power supply system usually supply power in multistage, to be connected with different loads as a convenience.

In the common power supply system, the output voltage at each stage is regulated by a regulated power converter, in order to keep the output voltages at each node being at predetermined values.

In this arrangement, the specification or the parameters of the each regulated power converter is limited. Thus, such common power supply system cannot be implemented with the minimum losses in transformation. As a result, the conversion efficiency of the power converter is reduced.

Moreover, as the architecture of the regulated power converter is more complicated, the size of the regulated power converter is large. Accordingly, the size of the power supply system using multiple regulated power converters is large, and the complexity of the layout design is thus increased.

SUMMARY

An aspect of the present disclosure is to provide power supply system that includes a first converting stage, a second converting stage, and a third converting stage. The first converting stage is configured to generate a first voltage according to a first input voltage. The second converting stage is coupled to the first converting stage in series, and includes a first non-regulated power converter and a second non-regulated power converter. The first non-regulated power converter is configured to generate a second voltage according to the first voltage. The second non-regulated power converter is configured to generate a third voltage according to the second voltage. The second voltage is higher than the third voltage, and a varying range of the second voltage is wider than a varying range of the third voltage. The third converting stage is configured to generate a first output voltage according to the third voltage.

One aspect of the present disclosure is to provide an uninterruptible power supply system that includes a first converting stage, a second converting stage, a third converting stage, and an uninterruptible power supply unit. The first converting stage is configured to receive an input voltage. The second converting stage includes a first non-regulated power converter and a second non-regulated power converter. The first non-regulated power converter is coupled to the first converting stage in series. The second non-regulated power converter is coupled to the first non-regulated power converter in series. The third converting stage is coupled to the second non-regulated power converter in series, and is configured to generate an output voltage to drive a load. The uninterruptible power supply unit is coupled to a node between the first converting stage and the first non-regulated power converter, or a node between the first non-regulated power converter and the second non-regulated power converter, or a node between the second non-regulated power converter and the third converting stage.

One aspect of the present disclosure is to provide a power supply method. The power supply method includes operations below: generating a first voltage by a first regulated power converter according to an input voltage; generating a second voltage by a first non-regulated power converter according to the first voltage; generating a third voltage by a second non-regulated power converter according to the second voltage, the second voltage being higher than the third voltage, and a varying range of the second voltage being wider than a varying range of the third voltage; and generating an output voltage by a second regulated power converter according to the third voltage.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

In this document, the terms "a power converter," "a converting stage," "a first power converter," "a second power converter," etc., may be used herein to be referred to as a combination of various elements or components able to perform the same or similar functions. The differences between terms "one," and "another one," "a stage," and "another stage," are not limited in numbers of packaged or installed elements or components. For example, in this document, "a power converter" may be implemented with multiple power converters. "A converting stage" may be implemented with multiple converting stages. "A converting stage" may include one or more "power converters", but the present disclosure is not limited thereto.

In this document, the term "coupled" may also be termed as "electrically coupled," and the term "connected" may be termed as "electrically connected." "Coupled" and "connected" may also be used to indicate that two or more elements cooperate or interact with each other.

Figure 1:
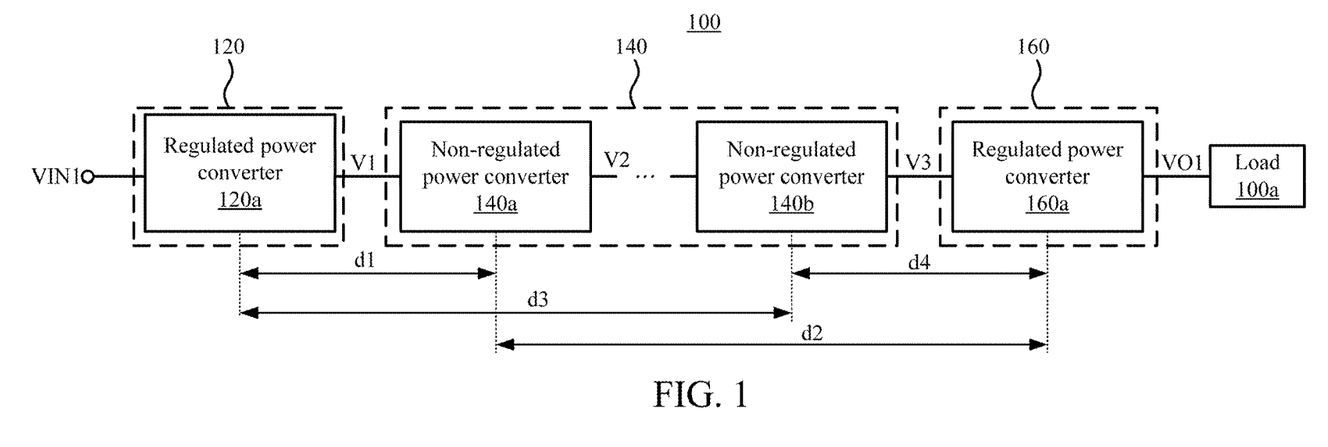
FIG. 1 is a schematic diagram of a power supply system, according to some embodiments of the present disclosure.

Reference is now made to FIG. 1. FIG. 1 is a schematic diagram of a power supply system, according to some embodiments of the present disclosure. As shown in FIG. 1, the power supply system 100 includes converting stages 120, 140, and 160.

The converting stage 120 is able to receive an input voltage VIN1. The converting stage 120 includes a regulated power converter 120a, in order to generate a voltage V1 according to the input voltage VIN1.

As shown in FIG. 1, in an embodiment, the converting stage 140 is coupled to the converting stage 120 in series, and includes non-regulated power converters 140a and 140b.

The non-regulated power converter 140a generates a voltage V2 according to the voltage V1. The non-regulated power converter 140b is coupled to the non-regulated power converter 140a in series, to generate a voltage V3 according to the voltage V2.

The converting stage 160 includes a regulated power converter 160a. The regulated power converter 160a is coupled to the non-regulated power converter 140b of the converting stage 140 in series, to generate an output voltage VO1 to drive a load 100a according to the voltage V3. In some embodiments, the power supply system 100 is able to be applied to data centers, and the load 100a may be a server.

In the embodiments, the regulated power converter 120a and the regulated power converter 160a are able to regulate voltages, including, for example, the voltage V1 and the output voltage VO1, with a closed-loop control. In other words, the voltage V1 and the output voltage VO1 are able to be adjusted by using different reference signals, such that the voltage V1 and the output voltage VO1 are kept at predetermined values. In the embodiments, the non-regulated power converter 140a and the non-regulated power converter 140b uses an open-loop control to change the voltage V2 and the voltage V3. In other words, the voltage V2 and the voltage V3 are varied with the corresponding input voltages (i.e., the voltage V1 or the voltage V2).

Moreover, in the embodiments, the voltage V2 is configured to be higher than the voltage V3, and a varying range of the voltage V2 is also configured to be wider than a varying range of the voltage V3. In other words, the non-regulated power converter 140a is configured to output a voltage having higher voltage level and wider varying range than the voltage output by the non-regulated power converter 140b.

In some embodiments, if only a single power converter is utilized in the converting stage 140, such single power converter may be disposed at a location near to the converting stage 120, to meet normal safety codes.

In some other embodiments, the converting stage may include at least two non-regulated power converters. With such arrangement, the location of the non-regulated power converter 140a may be near to the converting stage 120, to meet the safety codes. As the voltage V3 is relatively lower, the requirement of the safety codes is lower for the non-regulated power converter 140b. The location of the non-regulated power converter 140b is near to the converting stage 160, in order to reduce the current losses in transmission.

Explained in a different way, as shown in FIG. 1, as far as length of wires or locations are concerned, a distance d1 is present in the non-regulated power converter 140a and the converting stage 120, and a distance d2 is present in the non-regulated power converter 140a and the converting stage 160, in which the distance d1 is less than the distance d2. Similarly, as far as the length of wires or locations are concerned, a distance d3 is present between the non-regulated power converter 140b and the converting stage 120, and a distance d4 is present between the non-regulated power converter 140b and the converting stage 160, in which the distance d4 is less than the distance d3. The arrangements of the distances are given for illustrative purposes only, and the present disclosure is not limited thereto.

In addition, as the voltage V2 outputted from the non-regulated power converter 140a may be higher than the voltage V3, the current outputted from the non-regulated power converter 140a may be lower. As a result, the transmission losses in the power supply system 100 may be reduced. Furthermore, as the current outputted from the non-regulated power converter 140a is lower, a power line having a small diameter may be utilized in the system. Accordingly, it is more convenient for operators to design layout. The arrangement of the non-regulated power converter 140a is given for illustrative purpose only, and the present disclosure is not limited thereto.

Figure 2:
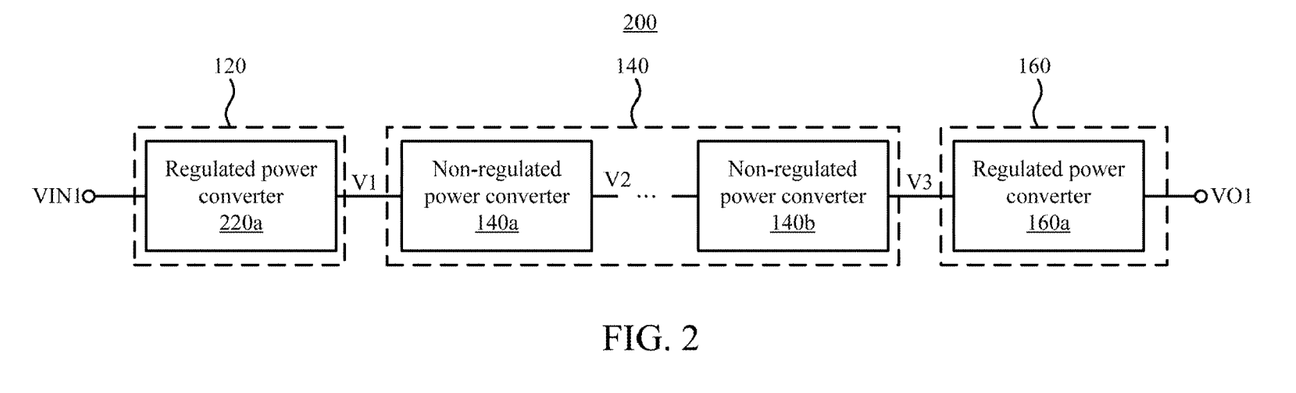
FIG. 2 is schematic diagram of a power supply system, according to some embodiments of the present disclosure.

Reference is now made to FIG. 2. FIG. 2 is schematic diagram of a power supply system, according to some embodiments of the present disclosure. In some embodiments, when the input voltage VIN1 is an AC power, the converting stage 120 of a power supply system 200 may include a regulated power factor corrector (PFC) 220a, in order to improve power factor and reduce the impacts of high-order harmonic noises.

For example, in some embodiments, the input voltage VIN1 may be a two-phase AC voltage of about 220 volts or a three-phase AC voltage of about 380 volts. The regulated PFC 220a may convert the input voltage VIN1 in to a DC voltage of 400 volts as the voltage V1. The non-regulated power converter 140a may convert the voltage V1 to a DC voltage ranging from 18-72 Volts as the voltage V2. The non-regulated power converter 140b may convert the voltage V2 to a DC voltage ranging from 6-15 Volts as the voltage V3. Thus, the voltage difference between the input voltage and the output voltage of the converting stage 160 is reduced. As a result, the conversion efficiency of the converting stage 160 is improved.

Alternatively, in some other embodiments, the input voltage VIN1 may be an AC voltage of about 10K Volts. The regulated PFC 200a may convert the input voltage VIN1 into a high DC voltage as the voltage V1. The converting stage 140 may convert the voltage V1 into a DC voltage ranging from 6-15 Volts as the voltage V3, in order to provide the voltage V3 to the converting stage 160 to drive the load 100a.

The varying ranges of the voltages V2-V3 are given for illustrative purposes, and the present disclosure is not limited thereto. Person skilled in the art is able to set the operating voltage range of each converting stages according to practical requirements.

Figure 3:
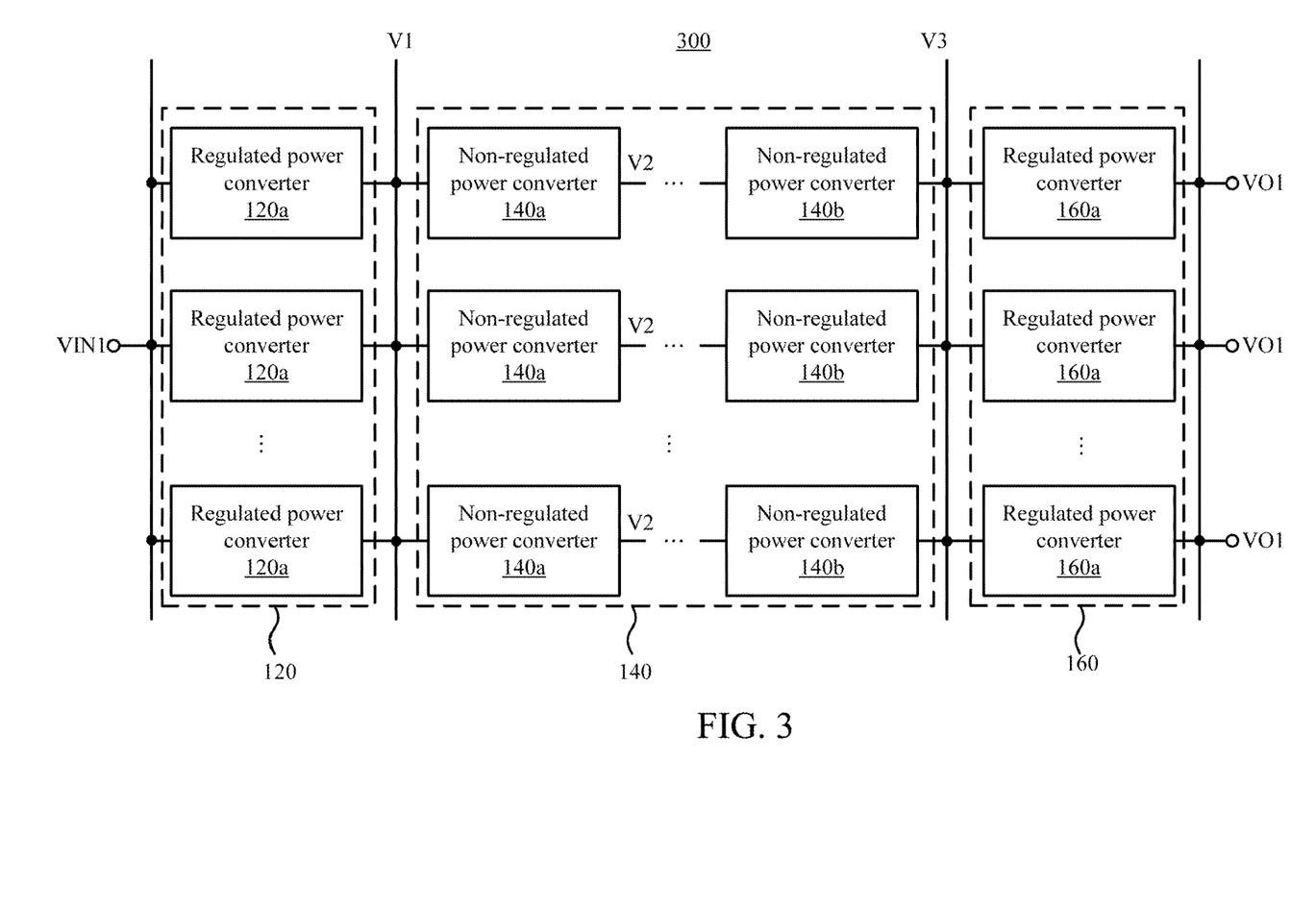
FIG. 3 is a schematic diagram of a power supply system, according to some embodiments of the present disclosure.
Figure 4:
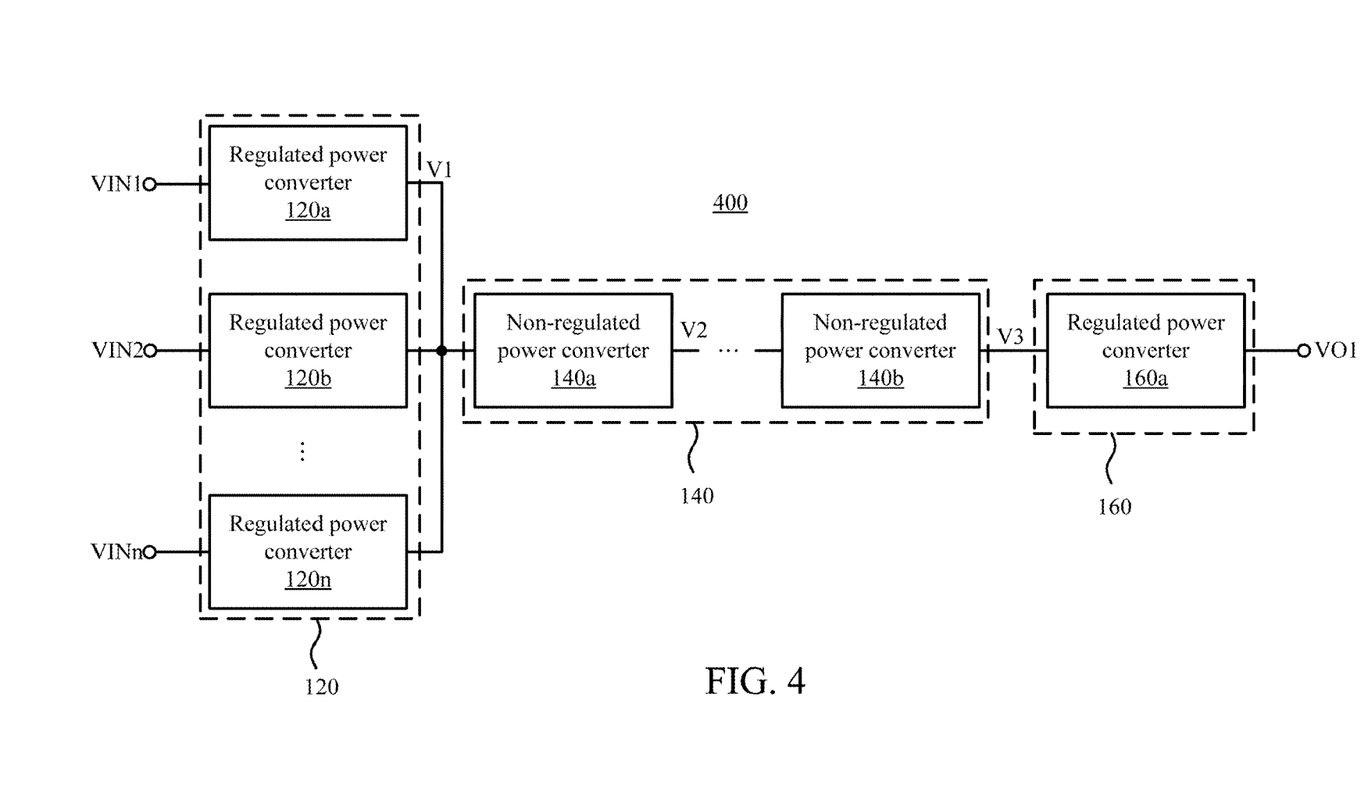
FIG. 4 is a schematic diagram of a power supply system, according to some embodiments of the present disclosure.
Figure 5:
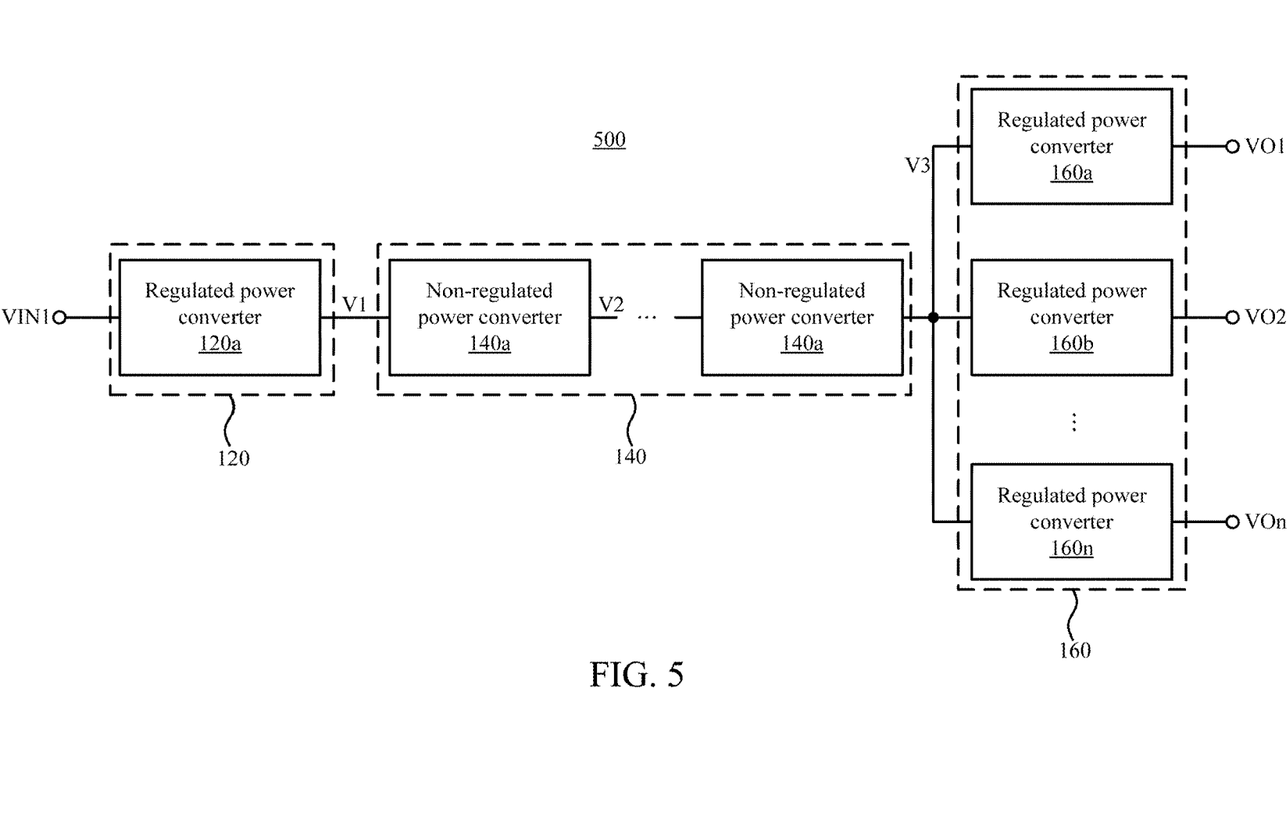
FIG. 5 is a schematic diagram of a power supply system, according to some embodiments of the present disclosure.

Reference is now made to FIG. 3, FIG. 4, and FIG. 5. FIG. 3 is a schematic diagram of a power supply system, according to some embodiments of the present disclosure. FIG. 4 is a schematic diagram of a power supply system, according to some embodiments of the present disclosure. FIG. 5 is a schematic diagram of a power supply system, according to some embodiments of the present disclosure.

The power supply system 100 or the power supply system 200, as illustrated above, is given for illustrative purposes only, and the present disclosure in not limited thereto. In various embodiments, the converting stages 120, 140, and 160 may have different arrangements.

For illustration of FIG. 3, in the power supply system 300, the converting stage 120 include a group of regulated power converters 120a, the converting stage 140 includes a group of non-regulated power converters 140a and a group of non-regulated power converters 140b, and the converting stage 160 includes a group of regulated power converter 160a.

In some embodiments, the regulated power converters 120a are coupled in parallel with each other, to generate the voltage V1 according to the input voltage VIN1. Each non-regulated power converter 140a is coupled to at least one of the non-regulated power converter 140b in series. The number of the non-regulated power converters in the combination of the series-coupled non-regulated power converters is not limited to two. Such combinations are coupled in parallel with each other, and generate the voltage V2 according to the voltage V1. Similarly, the regulated power converters 160a are coupled in parallel with each other, and generate voltages VO1 according to the voltage V3, to drive one or more load. The arrangements of the power supply system 300 are given for illustrative purposes only, and the present disclosure is not limited thereto.

Alternatively, as illustrated in some embodiments of FIG. 4, in the power supply system 400, the converting stage 120 includes regulated power converters 120a-120n. Each regulated power converters 120a-120n may generate the voltage V1 according to different input power sources. For illustration, the regulated power converters 120a may generate the voltage V1 according to the input voltage VIN1, and the regulated power converters 120n may generate the voltage V1 according to the input voltage VINn. The arrangements of the power supply system 400 are given for illustrative purposes only, and the present disclosure is not limited thereto.

Similarly, as illustrated in some embodiments of FIG. 5, in the power supply system 500, the converting stage 160 includes regulated power converters 160a-160n. Each regulated power converter 160a-160n may generate different output voltages VO1-VOn according to the voltage V3, to drive different loads. For illustration, the power converter 160a may generate the output voltage VO1 according to the voltage V3, the power converter 160b may generate the output voltage VO2 according to the voltage V3, and the power converter 160n may generate the output voltage VOn according to the voltage V3. The arrangements of the power supply system 500 are given for illustrative purposes only, and the present disclosure is not limited thereto.

The arrangement of the parallel-coupled power converters may be used as a redundant design for the power supply system 100. For example, when any one of the power converters in the converting stages is malfunctioning, the power supply system 100 may be able to supply power via other power converters. As a result, the reliability and the convenient maintenance of the power supply system 100 are increased.

Figure 6:
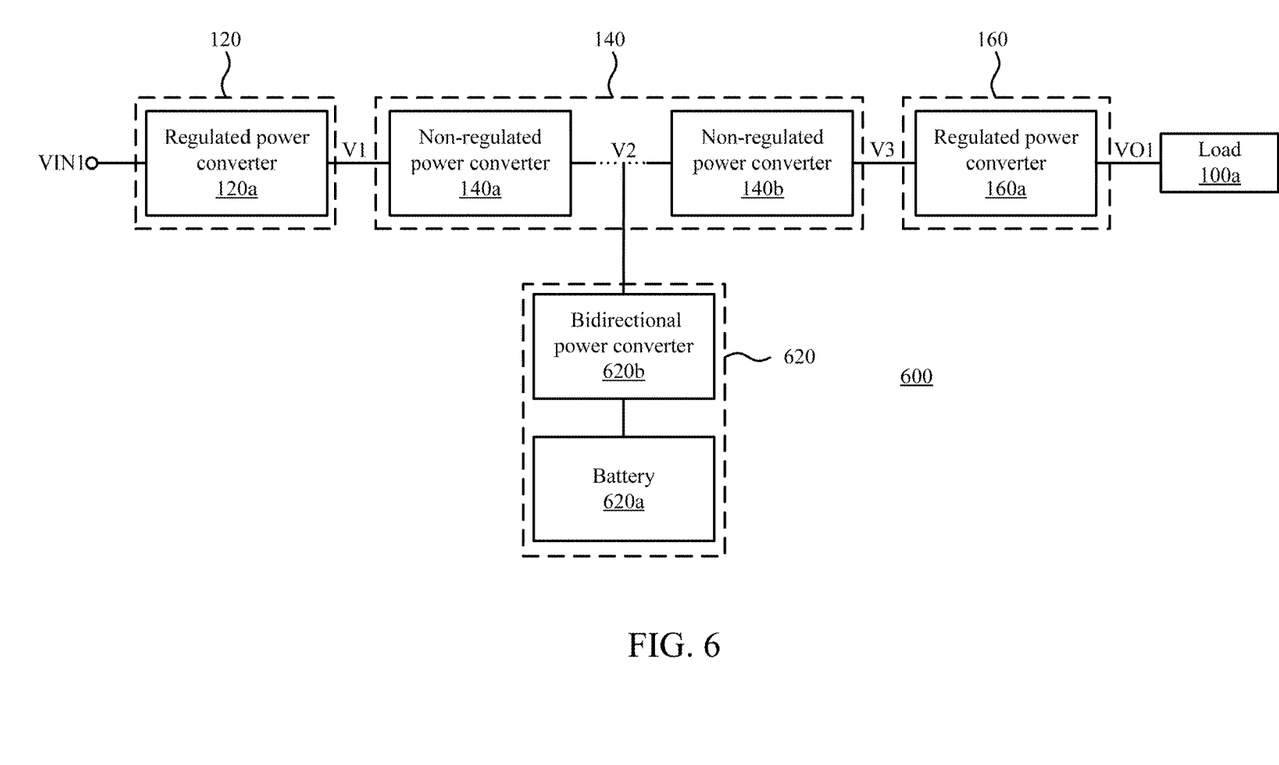
FIG. 6 is a schematic diagram of an uninterruptible power supply system, according to some embodiments of the present disclosure.

Reference is now made to FIG. 6. FIG. 6 is a schematic diagram of an uninterruptible power supply system, according to some embodiments of the present disclosure. Compared with the power supply system 100 in FIG. 1, the uninterruptible power supply system 600 further includes an uninterruptible power supply unit 620.

In some embodiments of FIG. 6, the uninterruptible power supply unit 620 is coupled to a node between the non-regulated power converter 140a and the non-regulated power converter 140b. In some embodiments, the uninterruptible power supply unit 620 includes a battery 620a and a bidirectional power converter 620b, but the present disclosure is not limited thereto. The battery 620a is coupled to the bidirectional power converter 620b. The bidirectional power converter 620b may control the battery 620a to be charged or discharged according to the voltage V2. For example, in this embodiment, when the input voltage VIN1 stops being supplied due to a malfunction or an error status, the batter 620a may be discharged via the bidirectional power converter 620b. Thus, the bidirectional power converter 620 may provide power to the following circuits, such that the converting stage 160 is kept outputting the output voltage VO1 to the load 100a. The arrangement of the uninterruptible power supply unit 620 is given for illustrative purposes only, and the present disclosure is not limited thereto. Other power sources or converting operations, for example, including a flywheel energy storage system, are also within contemplated scope of the present disclosure.

Figure 7:
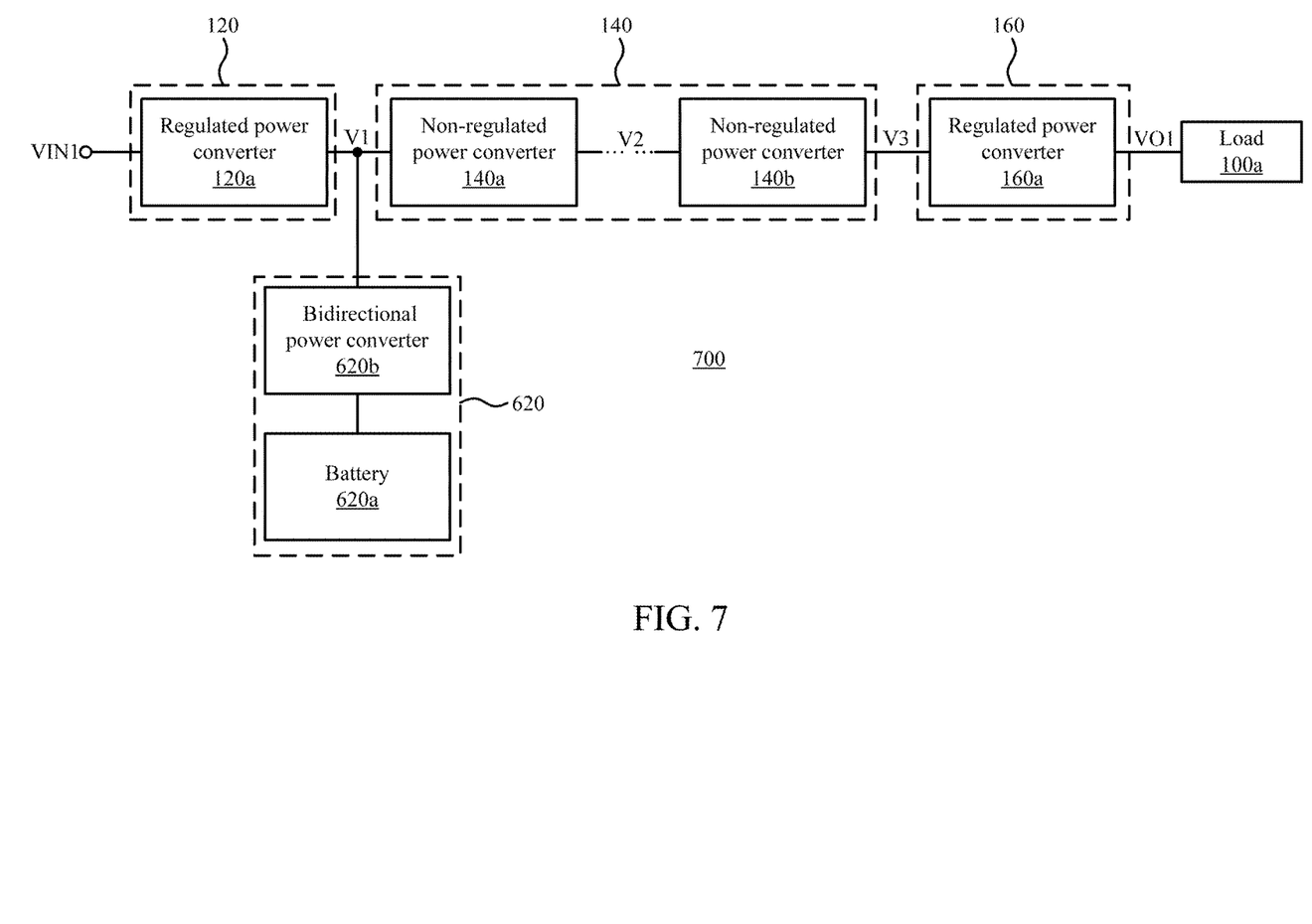
FIG. 7 is a schematic diagram of an uninterruptible power supply system, according to some embodiments of the present disclosure.

Reference is now made to FIG. 7. FIG. 7 is a schematic diagram of an uninterruptible power supply system, according to some embodiments of the present disclosure. Compared with the uninterruptible power supply system 600 in FIG. 6, the uninterruptible power supply unit 620 of the uninterruptible power supply system 700 is coupled to a node between the converting stage 120 and the converting stage 140. In this embodiment, the bidirectional power converter 620b may control the battery 620a to be charged or discharged according to the voltage V1. The related operations are similar with the operations described above, and thus the repetitious descriptions are not given here.

Figure 8:
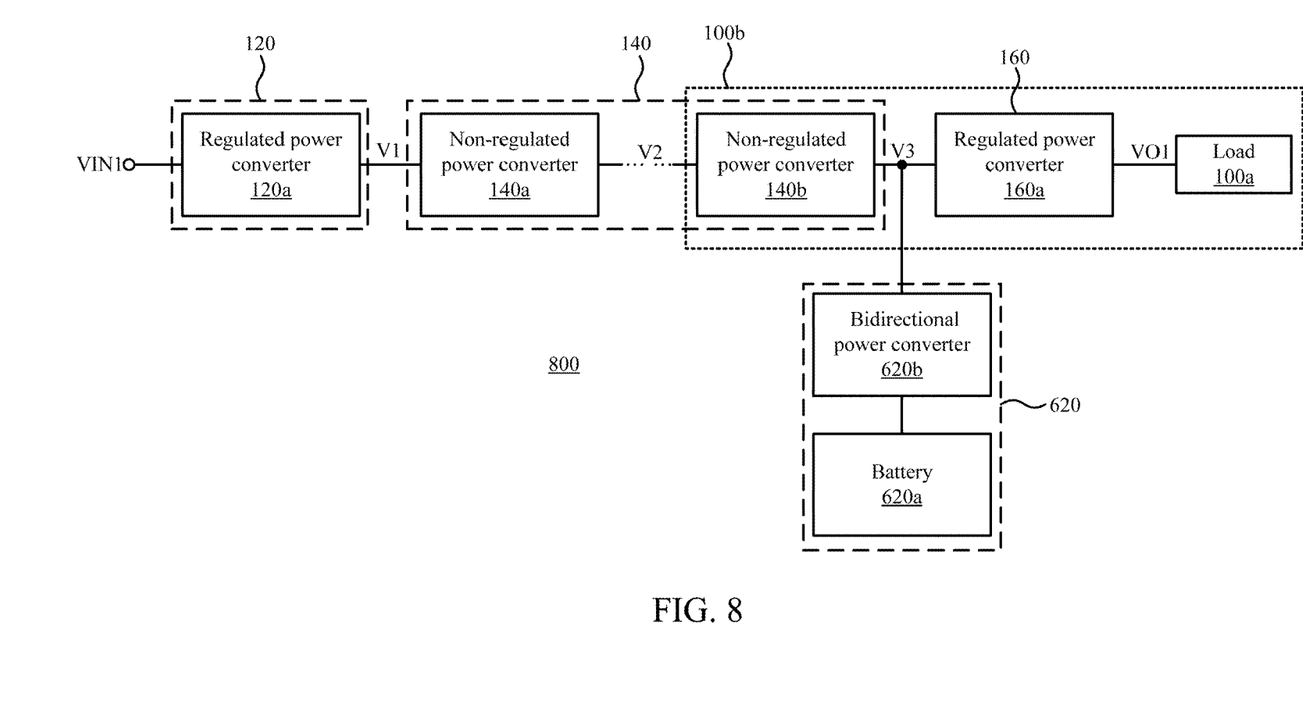
FIG. 8 is a schematic diagram of an uninterruptible power supply system, according to some embodiments of the present disclosure.

Reference is now made to FIG. 8. FIG. 8 is a schematic diagram of an uninterruptible power supply system, according to some embodiments of the present disclosure. Compared with the uninterruptible power supply system 600 in FIG. 6, the uninterruptible power supply unit 620 of the uninterruptible power supply system 800 is coupled to a node between the converting stage 140 and the converting stage 160. In this embodiment, the bidirectional power converter 620b may control the battery 620a to be charged or discharged according to the voltage V3. The related operations are similar with the operations described above, and thus the repetitious descriptions are not given here.

In brief, in various embodiments, the uninterruptible power supply unit 620 may be selectively disposed at at least one of the node between the converting stage 120 and the non-regulated power converter 140a, the node between the non-regulated power converter 140a and the non-regulated power converter 140b, and the node the non-regulated power converter 140b and the converting stage 160. As a result, the reliability of the power supply system 100 is further improved.

The arrangements of the uninterruptible power supply unit 620 are given for illustrative purposes only, and the present disclosure is not limited thereto. In various embodiments, the uninterruptible power supply unit 620 may be disposed between any two converting stages or two power converters in the power supply system according different applications. Therefore, various arrangements of the uninterruptible power supply unit 620, which are applicable to the power supply system, are within contemplated scope of the present disclosure.

Moreover, in some embodiments, as the non-regulated power converter has simple circuit architecture, the size of the non-regulated power converter may be relatively small. Thus, in some other embodiments, as shown in FIG. 8, the non-regulated power converter 140b and the converting stage 160 may be disposed on a main board 100b of the load 100a. Accordingly, the layout design for the system can be simple and convenient.

It is noted that, in various embodiments described above, if the voltage required by the load is high, person skilled in the art may set additional regulated power converters, which may be coupled with nodes of the voltage V1, V2, or V3, to perform operations of power converting. Accordingly, a high voltage can be generated to drive the load.

Figure 9A:
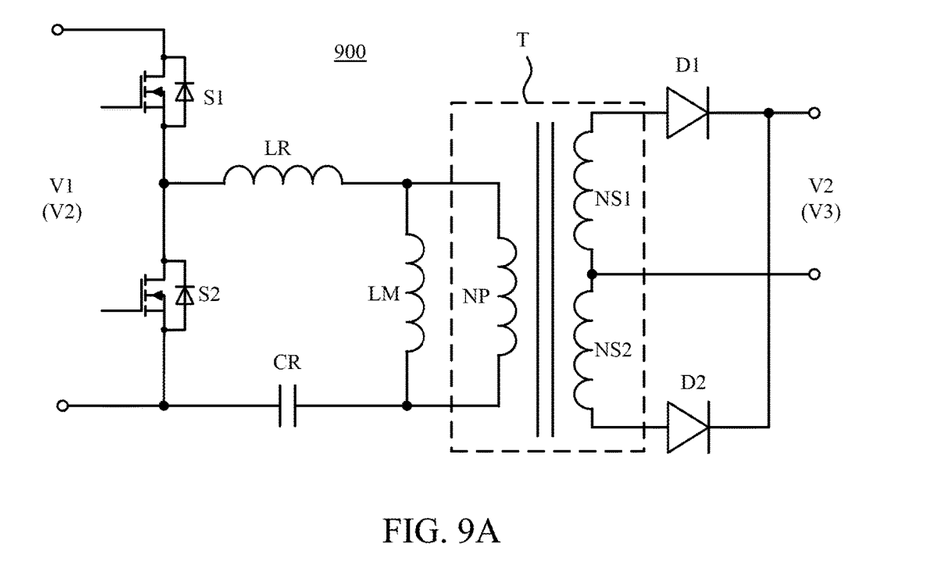
FIG. 9A is a schematic diagram of an non-regulated power converter, according to some embodiments of the present disclosure.

Reference is now made to FIG. 9A. FIG. 9A is a schematic diagram of a non-regulated power converter, according to some embodiments of the present disclosure. In various embodiments above, the non-regulated power converter 140a or the non-regulated power converter 140b may be implemented with pulse width modulation circuits and various resonant circuits, or implemented with isolation circuits according to practical requirements. The circuit architectures and the arrangements illustrated above can be implemented with multiple technological options, and the present disclosure is not limited thereto. In some embodiments, the converting stage 140 may be implemented with resonant circuits having zero voltage switching (ZVS) or zero current switching (ZCS), but the present disclosure is not limited thereto.

For illustration, as illustrated in some embodiments of FIG. 9A, the non-regulated power converter 900 may be a series resonant LLC circuit that includes switches S1 and S2, inductors LR and LM, a capacitor CR, a transformer T, and diodes D1 and D2, but the present disclosure is not limited thereto.

The switch S1 is coupled to the switch S2 in series, and is configured to receive the voltage V1 (or the voltage V2). The inductor LR is coupled to a node between the switch S1 and the switch S2. The inductor LR, the inductor LM, and the capacitor CR are coupled in series to form a resonant tank, in which the resonant tank is coupled in parallel with the switch S2. In greater detail, the transformer T includes windings NP, NS1, and NS2. The winding NP is coupled in parallel with the inductor LM. A first terminal of the diode D1 is coupled to the winding NS1, and a second terminal of the diode D1 is coupled between the winding NS1 and the winding NS2. The diode D2 is coupled between the winding NS2 and the second terminal of the diode D1.

In this example, the switches S1-S2 may achieve the zero voltage switching to have a lower turn-off current. The diodes D1-D2 may achieve the zero current switching to have a lower reverse recovery current. As a result, the conversion efficiency of the non-regulated power converter 800 is increased.

Figure 9B:
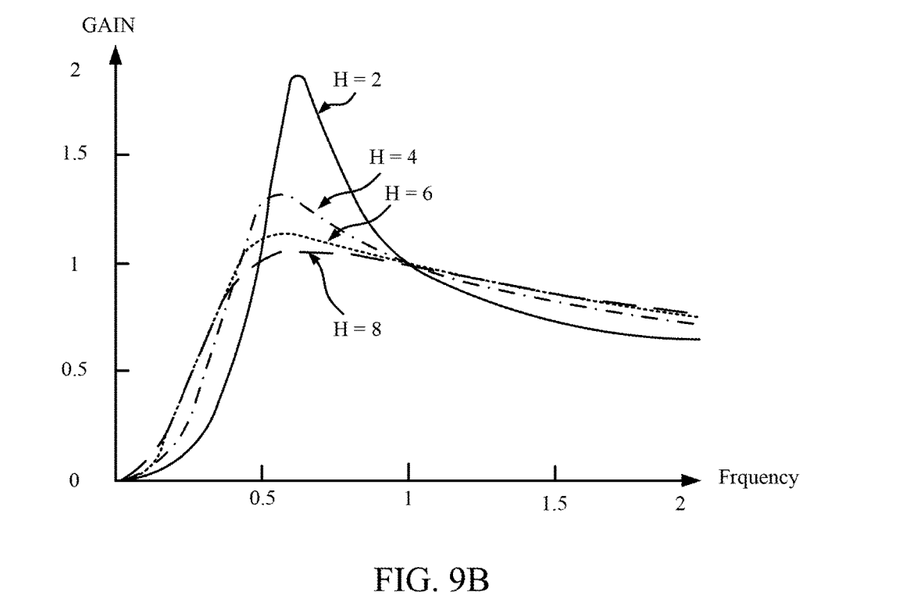
FIG. 9B illustrating a curve of voltage gain of the non-regulated power converter in FIG. 9A, according to some embodiments of the present disclosure.

Reference is now made to FIG. 9B. FIG. 9B illustrating a curve of voltage gain of the non-regulated power converter in FIG. 9A, according to some embodiments of the present disclosure. In FIG. 9B, H is defined as a ratio between the inductance of the inductor LM and the inductance of the inductor LR. In other words, the ratio H is LM/LR. The scale of the vertical axis is the gain of the non-regulated power converter 900, and the scale of the horizontal axis is a normalized operating frequency.

As shown in FIG. 9B, when the ratio is lower, i.e. the inductance of the inductor LM is lower, the varying range of the gain becomes wider with the frequency. Under this condition, the regulation ability of the power converter 900, for the output voltage, is higher. In the same power conversion efficiency, the current passing through the switch S1, the switch S2, the inductor LR, the capacitor CR, and the transformer T is increased. Accordingly, the losses in the power conversion may become higher. Alternatively, when the ratio H is higher, i.e., the inductance of the inductor LM is higher, the varying range of the gain becomes narrower with the frequency. Under this condition, the regulation ability of the power converter 900, for the output voltage, is lower. In the same power conversion efficiency, the current passing through the switch S1, the switch S2, the inductor LR, the capacitor CR, and the transformer T is decreased. Accordingly, the losses in the power conversion become lower. Thus, the converting stage 140 may be implemented with a resonant circuit having the higher ratio H, in order to further improve the conversion efficiency of the power supply system 100. The aforementioned arrangements are given for illustrative purposes only, and the present disclosure is not limited thereto.

Figure 10:
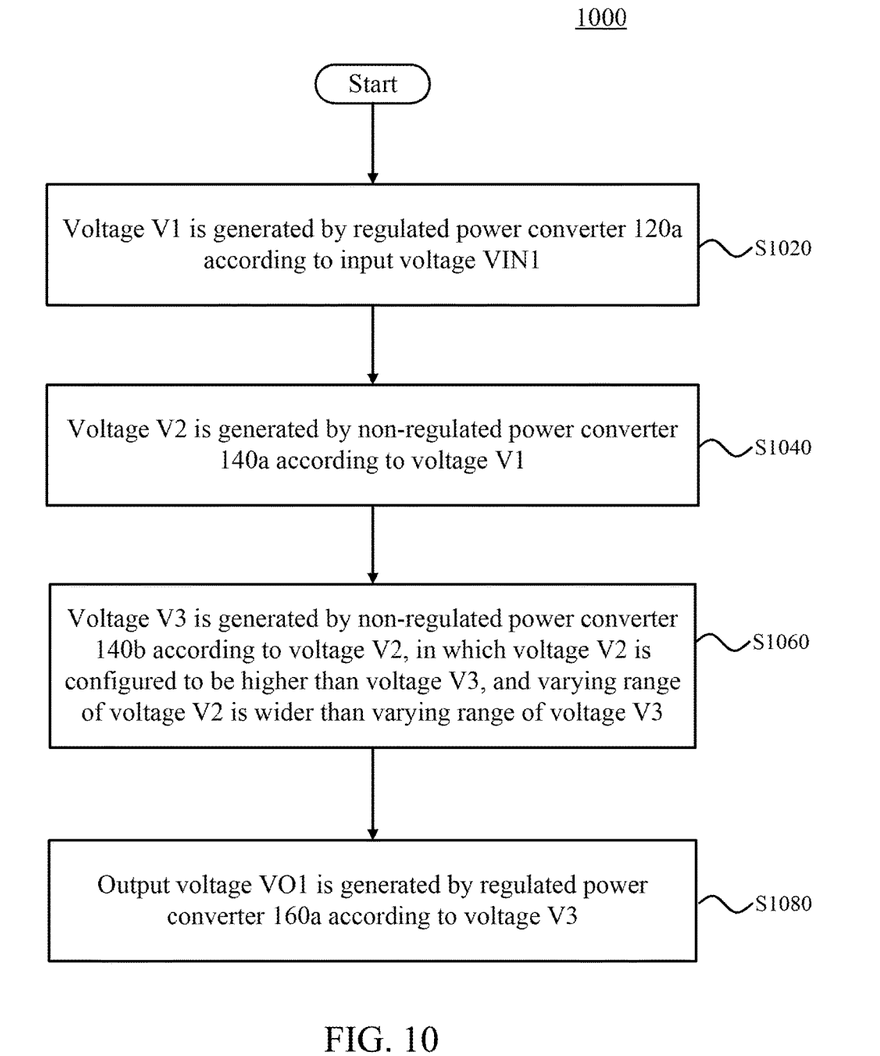
FIG. 10 is a flow chart of a power supply method, according to some embodiments of the present disclosure.

Another aspect of the present disclosure is to provide a power supply method. Reference is now made to FIG. 10. FIG. 10 is a flow chart of a power supply method, according to some embodiments of the present disclosure.

Reference is now made to both of FIG. 1 and FIG. 10. As an example, the operations of the power supply system 100 are described as implementing with the power supply method 1000. As shown in FIG. 10, the power supply method 1000 includes step S1020, step S1040, step S1060, and step S1080.

In step S1020, the voltage V1 is generated by the regulated power converter 120a according to the input voltage VIN1. In step S1040, the voltage V2 is generated by the non-regulated power converter 140a according to the voltage V1. In step S1060, the voltage V3 is generated by the non-regulated power converter 140b according to the voltage V2, in which the voltage V2 is configured to be higher than the voltage V3, and the varying range of the voltage V2 is wider than the varying range of the voltage V3. In step S1080, the output voltage VO1 is generated by the regulated power converter 160a according to the voltage V3.

For illustration, as shown in FIG. 2, when the input voltage VIN1 is a two-phase AC voltage of about 220 volts, the regulated power converter 120a may be a regulated PFC 220a. The regulated PFC 220a may convert the input voltage VIN1 to a DC voltage of 400 Volts as the voltage V1. The non-regulated power converter 140a may convert the voltage V1 to a DC voltage ranging from 18-72 Volts as the voltage V2. The non-regulated power converter 140b may convert the voltage V2 to a DC voltage ranging from 6-15 Volts as the voltage V3. The location of the non-regulated power converter 140a may be near to the converting stage 120, to meet the requirements of the safety codes. The location of the non-regulated power converter 140b may be near to the converting stage 160, to reduce losses in the transmission.

Moreover, in some other embodiments, an uninterruptible power supply mechanism is applied to the power supply method 1000. For illustration, as illustrated in FIGS. 6-8, the voltages V1, V2, or V3 may be utilized by the bidirectional power converter 620b to charge or discharge the battery 620a. The voltages V1-V3 are given for illustrative purposes only, and the present disclosure is not limited in using such exemplified voltages. When the input voltage VIN1 stops being supplied, the battery 620a may be discharged via the bidirectional power converter 620b. As a result, the reliability of supplying power is further increased.

As described above, in some embodiments, the power supply system, the uninterruptible power supply system, and the power supply method thereof provided in the present disclosure utilizes at least two non-regulated power converters, to have a better arrangement for layout design and an improvement of all power conversion efficiency.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply system, comprising:
   a first converting stage configured to generate a first voltage according to a first input voltage;
   a second converting stage coupled to the first converting stage in series, and the second converting stage comprising:
      a first non-regulated power converter configured to generate a second voltage according to the first voltage; and
      a second non-regulated power converter configured to generate a third voltage according to the second voltage, the second voltage being higher than the third voltage, and a varying range of the second voltage being wider than a varying range of the third voltage; and
   a third converting stage configured to generate a first output voltage according to the third voltage.

2. The power supply system of claim 1, wherein a first distance is configured to be present between the first non-regulated power converter and the first converting stage, a second distance is configured to be present between the first non-regulated power converter and the third converting stage, a third distance is configured to be present between the second non-regulated power converter and the first converting stage, a fourth distance is configured to be present between the second non-regulated power converter and the third converting stage, the first distance is less than the second distance, and the fourth distance is less than the third distance.

3. The power supply system of claim 1, wherein each of the first converting stage and the third converting stage comprises a regulated power converter.

4. The power supply system of claim 1, wherein the first converting stage comprises a regulated power factor corrector.

5. The power supply system of claim 1, wherein the first converting stage comprises:
   a plurality of regulated power converter coupled in parallel with each other, and configured to generate the first voltage according to the first input voltage.

6. The power supply system of claim 1, wherein the first converting stage comprises:
   a first regulated power converter configured to generate the first voltage according to the first input voltage; and
   a second regulated power converter configured to generate the first voltage according to a second input voltage.

7. The power supply system of claim 1, wherein the first converting stage further comprises:
   a third non-regulated power converter; and
   a fourth non-regulated power converter coupled to the third non-regulated power converter in series, wherein the series-coupled third non-regulated power converter and the fourth non-regulated power converter are further coupled in parallel with the series-coupled first non-regulated power converter and the second non-regulated power converter.

8. The power supply system of claim 1, wherein the third converting stage comprises:
   a plurality of regulated power converters coupled in parallel with each other, and configured to generate the first output voltage according to the third voltage.

9. The power supply system of claim 1, wherein the third converting stage comprises:
   a third regulated power converter configured to generate the first output voltage according to the third voltage; and
   a fourth regulated power converter configured to generate a second output voltage according to the third voltage.

10. The power supply system of claim 1, further comprising:
    an uninterruptible power supply unit coupled to a node between the first converting stage and the second converting stage, or a node between the first non-regulated power converter and the second non-regulated power converter, or a node between the second converting stage and the third converting stage.

11. The power supply system of claim 10, wherein the uninterruptible power supply unit comprises:
    a battery; and
    a bidirectional power converter configured to control the battery to be charged or discharged according to the first voltage, the second voltage, or the third voltage.

12. The power supply system of claim 1, wherein the first output voltage is configured to drive a load, and the second non-regulated power converter and the third converting stage are disposed on a main board of the load.

13. The power supply system of claim 1, wherein the first non-regulated power converter or the second non-regulated power converter comprises a resonant circuit, and the resonant circuit comprises:
    a first switch;
    a second switch coupled to the first switch in series;
    a first inductor coupled to a node between the first switch and the second switch;
    a second inductor coupled to the first inductor;
    a capacitor coupled to the second inductor, wherein the first inductor, the second inductor, and the capacitor are coupled in series to form a resonant tank, and the resonant tank is coupled in parallel with the second switch;
    a transformer coupled to the second inductor;
    a first diode coupled to the transformer; and
    a second diode coupled to the transformer and the first diode.

14. An uninterruptible power supply system, comprising:
a first converting stage configured to receive an input voltage;
a second converting stage comprising:
- a first non-regulated power converter coupled to the first converting stage in series; and
- a second non-regulated power converter coupled to the first non-regulated power converter in series;

a third converting stage coupled to the second non-regulated power converter in series, and configured to generate an output voltage to drive a load; and
an uninterruptible power supply unit coupled to a node between the first converting stage and the first non-regulated power converter, or a node between the first non-regulated power converter and the second non-regulated power converter, or a node between the second non-regulated power converter and the third converting stage.

15. The uninterruptible power supply system of claim 14, wherein a voltage outputted by the first non-regulated power converter is higher than a voltage outputted by the second non-regulated power converter, and a varying range of the voltage outputted by the first non-regulated power converter is wider than a varying range of the voltage outputted by the second non-regulated power converter.

16. The uninterruptible power supply system of claim 14, wherein a first distance is configured to be present between the first non-regulated power converter and the first converting stage, a second distance is configured to be present between the first non-regulated power converter and the third converting stage, a third distance is configured to be present between the second non-regulated power converter and the first converting stage, a fourth distance is configured to be present between the second non-regulated power converter and the third converting stage, the first distance is less than the second distance, and the fourth distance is less than the third distance.

17. The uninterruptible power supply system of claim 14, wherein the uninterruptible power supply unit comprises:
a battery; and
a bidirectional power converter configured to control the battery to be charged or discharged according to a voltage outputted by the first converting stage, or a voltage outputted by the first non-regulated power converter, or a voltage outputted by the second non-regulated power converter.

18. The uninterruptible power supply system of claim 14, wherein the second non-regulated power converter and the third converting stage are disposed on a main board of the load.

19. A power supply method, comprising:
generating a first voltage by a first regulated power converter according to an input voltage;
generating a second voltage by a first non-regulated power converter according to the first voltage;
generating a third voltage by a second non-regulated power converter according to the second voltage, the second voltage being higher than the third voltage, and a varying range of the second voltage being wider than a varying range of the third voltage; and
generating an output voltage by a second regulated power converter according to the third voltage.

20. The power supply method of claim 19, further comprising:
charging or discharging a battery by a bidirectional power converter according to the first voltage, the second voltage, or the third voltage.

* * * * *